Aug. 6, 1929.   F. W. HERTRICH ET AL   1,723,419
BRAKE
Filed Jan. 19, 1925

Inventors
Benton Cataline &
Frederick W. Hertrich

By Blackmore, Spencer, & Fluch
Attorneys

Patented Aug. 6, 1929.

1,723,419

UNITED STATES PATENT OFFICE.

FREDERICK W. HERTRICH AND BENTON CATALINE, OF FLINT, MICHIGAN, ASSIGNORS TO GENERAL MOTORS CORPORATION, OF DETROIT, MICHIGAN, A CORPORATION OF DELAWARE.

BRAKE.

Application filed January 19, 1925. Serial No. 3,476.

This invention relates to brakes and is herein shown as embodied in a brake for motor vehicle wheels.

Vehicle brakes, in common prior constructions, have the ends of the brake band separated by a gap which allows mud, water, etc., to work in between the band and the brake drum and this, particularly in freezing weather, prevents satisfactory action of the brake. Furthermore, the operation of the usual bent lever by the brake rod causes one end of the band to move inwardly towards the drum and, by localizing the pressure, produces what is known as a "squeaky brake." It is, accordingly, an object of this invention to produce a brake which will eliminate the above noted and other disadvantages. In one desirable construction as illustrated, we extend a plate across the above mentioned gap so that the plate overlies both ends of the brake band, thus closing the space between the ends of the band against the entrance of foreign matter, also distributing the pressure when the brake is applied and constraining the band to move circumferentially.

To these ends and also to improve generally upon devices of the character indicated, the invention consists in the various matters hereinafter described and claimed.

Referring to the drawings.

Figure 1:
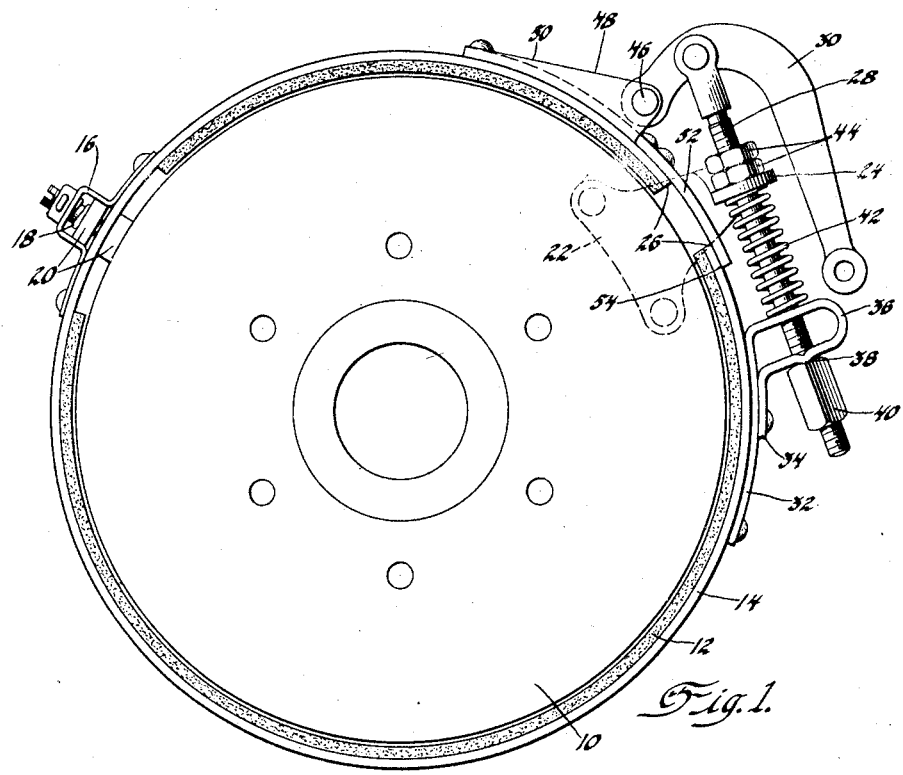
Figure 1 is a side elevation of a brake.
Figure 2:
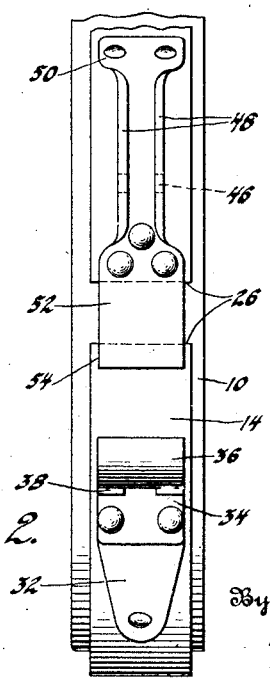
Figure 2 is an end view thereof with some parts removed.

The numeral 10 indicates the usual brake drum having a brake lining 12 on a brake band 14. A saddle or clip 16 fixed to the brake band is yieldingly connected at 18 with an angular bracket 20 fastened to the side of the brake drum. A bracket 22 is fastened to the brake drum and has an integral lug 24 bent inwardly outside the gap 26 between the adjacent ends of the brake band. The lug 24 is apertured to admit a threaded bolt 28 pivotally connected at one end to a bent operating lever 30 and having its other end extended loosely through openings in a clip comprising lapping end portions 32 and 34 riveted to the brake band and a loop portion 36 one side of which has a ridge 38 rockable in a corresponding depression in a nut 40 threaded on the end of the bolt 28. A spring 42 is coiled around the bolt between the other side of the loop and the lug 24 and nuts 44 are threaded on the bolt at the opposite side of the lug 24.

The bent operating lever 30 is pivotally connected at 46 between spaced ears 48 bent up from an anchor plate or clip 50 which is riveted to one end of the brake band. The plate has an extension 52 carried across the gap 26 and lapping the other end of the brake band at 54. Thus, foreign matter is excluded from the space between the ends of the brake band and cannot work in between the lining and the drum. Ordinarily, the operation of a brake causes a localization of pressure between the clip end of the brake band and the drum and produces what is known as "squeaky brakes." In the above construction, however, the clip extension 52, by straddling the gap 26, bears on the outer face of the other end of the band and the band is thereby constrained to move circumferentially.

Although the invention has been described by reference to a specific construction, it should be understood that, in its broader aspects, it is not necessarily limited to the form selected for mere illustrative purposes.

We claim:

In a brake, a drum, a band surrounding said drum, rigid means secured to one end of the band and overlapping the other end whereby, when the brake is contracted upon the drum, localized radial movement of the ends of the band is prevented, a lever pivoted at one end to said rigid means, means at the other end of said lever for engagement with operative mechanism to rock the same, link means connecting the other end of said band to said lever at an intermediate point on the lever and substantially removed from the connection between the lever and the rigid means.

In testimony whereof we hereunto affix our signatures.

FREDERICK W. HERTRICH.
BENTON CATALINE.